(12) United States Patent
Tung et al.

(10) Patent No.: US 10,212,554 B2
(45) Date of Patent: *Feb. 19, 2019

(54) VELOCITY-WEIGHTED ANALYSIS OF USER EQUIPMENT LOCATION DATA

(71) Applicant: AT&T INTELLECTUAL PROPERTY I, L.P., Atlanta, GA (US)

(72) Inventors: Kuang-Chi Tung, Frisco, TX (US); Mark Austin, Roswell, GA (US); Sheldon Meredith, Roswell, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/119,756

(22) Filed: Aug. 31, 2018

(65) Prior Publication Data

US 2018/0376288 A1   Dec. 27, 2018

Related U.S. Application Data

(63) Continuation of application No. 15/438,692, filed on Feb. 21, 2017, now Pat. No. 10,097,960.

(51) Int. Cl.
*H04W 4/02* (2018.01)
*H04W 4/029* (2018.01)

(52) U.S. Cl.
CPC ............ *H04W 4/027* (2013.01); *H04W 4/029* (2018.02)

(58) Field of Classification Search
CPC ........ G08B 25/016; H04W 4/02; H04W 4/22; H04W 64/00; H04W 76/007;
(Continued)

(56) References Cited

U.S. PATENT DOCUMENTS 7,532,113 B2 * 5/2009 Horvitz ................ G01O 21/206
                                                        340/539.13
8,290,509 B2 * 10/2012 Jung ................... H04M 1/72563
                                                        455/441
(Continued)

OTHER PUBLICATIONS

Li, et al. "Inferring movement trajectories from GPS snippets." Proceedings of the Eighth ACM International Conference on Web Search and Data Mining. WSDM 2015, Feb. 2-6, 2015, Shanghai, China. 10 pages.

(Continued)

*Primary Examiner* — Babar Sarwar
(74) *Attorney, Agent, or Firm* — Amin, Turocy & Watson, LLP

(57) ABSTRACT

Velocity-weighted analysis of UE location data is disclosed. UE velocity can be determined from the change in position and time. UE dwell can also be determined from the change in position and time. UE dwell and UE velocity can be inversely related. UE dwell an UE velocity can be correlated to a likelihood that an event occurrence related to a point of interest affects UE travel between a first and second location. A location of the point of interest can be determined to be in a region corresponding to a path between the first and second location. The region can be associated with the UE dwell and/or UE velocity, such that a probability of interaction can be determined for the event occurrence for the point of interest. The region can comprise a probable UE path based on historical UE data.

20 Claims, 10 Drawing Sheets

(58) Field of Classification Search
CPC ......... H04W 4/027; H04W 4/029; G01S 5/02;
G01S 5/0252; G01S 5/14; G01S 19/14;
H04L 29/08657; H04L 29/08108; H04L
29/08936; G01C 21/20; H04M 1/72572
USPC .............................................. 455/456.1–457
See application file for complete search history.

(56) References Cited

U.S. PATENT DOCUMENTS

| | | | | |
|---|---|---|---|---|
| 8,577,602 | B2* | 11/2013 | Walder | G01C 21/3682 701/426 |
| 8,666,434 | B1* | 3/2014 | Taylor | G01S 19/39 455/404.2 |
| 8,718,619 | B2 | 5/2014 | Lidstrom et al. | |
| 8,838,138 | B2* | 9/2014 | Modali | H04W 4/027 455/456.1 |
| 8,958,822 | B2* | 2/2015 | Liang | H04W 4/02 340/988 |
| 9,165,304 | B2* | 10/2015 | Weiss et al. | G06Q 10/00 |
| 9,294,880 | B2 | 3/2016 | Brisebois | |
| 9,301,114 | B2* | 3/2016 | Cao | G01S 5/02 |
| 9,330,401 | B2* | 5/2016 | Terrell, II | G06Q 30/0267 |
| 9,351,111 | B1 | 5/2016 | Kaufman et al. | |
| 9,398,556 | B2 | 7/2016 | Fix et al. | |
| 2004/0219932 | A1* | 11/2004 | Verteuil | H04L 12/14 455/456.2 |
| 2006/0287810 | A1* | 12/2006 | Sadri | G01C 21/20 701/438 |
| 2007/0118278 | A1* | 5/2007 | Finn | G06F 17/30241 701/438 |
| 2010/0279708 | A1* | 11/2010 | Lidsrom | H04W 4/02 455/456.1 |
| 2012/0046861 | A1* | 2/2012 | Feldbauer | G01C 21/3682 701/426 |
| 2012/0310737 | A1* | 12/2012 | Song | G06Q 30/0261 705/14.57 |
| 2013/0132202 | A1* | 5/2013 | Gordon | G06Q 30/02 705/14.58 |
| 2013/0178233 | A1* | 7/2013 | McCoy | H04W 4/021 455/456.3 |
| 2014/0120954 | A1* | 5/2014 | Horvitz | G08G 1/01 455/456.4 |
| 2014/0256357 | A1* | 9/2014 | Wang | H04W 4/02 455/456.3 |
| 2015/0065173 | A1* | 3/2015 | Pliner | H04W 4/04 455/456.3 |
| 2015/0094021 | A1* | 4/2015 | Su | H04W 48/04 455/411 |
| 2015/0198722 | A1* | 7/2015 | Ben-Akiva | G01S 19/49 701/472 |
| 2015/0348117 | A1* | 12/2015 | Busch | H04W 4/029 705/14.44 |
| 2015/0348415 | A1* | 12/2015 | Levy | G08G 1/144 340/932.2 |
| 2016/0253689 | A1 | 9/2016 | Milton et al. | |
| 2017/0272972 | A1* | 9/2017 | Egner | H04W 28/0268 |

OTHER PUBLICATIONS

Notice of Allowance dated May 31, 2018 for U.S. Appl. No. 15/438,692, 39 pages.

* cited by examiner

VELOCITY-WEIGHTED ANALYSIS OF USER EQUIPMENT LOCATION DATA

RELATED APPLICATIONS

This application is a continuation of, and claims priority to U.S. patent application Ser. No. 15/438,692, filed on 21 Feb. 2017, and entitled "VELOCITY-WEIGHTED ANALYSIS OF USER EQUIPMENT LOCATION DATA." The entirety of the aforementioned application is hereby incorporated by reference herein.

TECHNICAL FIELD

The disclosed subject matter relates to a velocity-weighted analysis of user equipment (UE) location data that enables correlation of a dwell value to an event for a geographic location.

BACKGROUND

UE location data can indicate a location of a UE at a point in time. Conventional UE location data analysis can determine a path of travel for a UE, e.g., a route the UE takes in time and space. The path of travel can be correlated to a geographical location associated with a point of interest (POI). The movement of a UE relative to a POI can be employed to evaluate the effect of an event associated with the POI. As an example, in a conventional system, a POI can be grocery store and an event can be an advertisement served to nearby UEs. UE location data can conventionally be employed to determine an effect of the advertising on UE traffic to the grocery store. Conventional systems, however, can do a poor job of providing analysis where the UE has a less than explicit response to the event, e.g., where the UE does not directly approach the grocery store, etc. Moreover, conventional systems can fail to consider other events that occur in an area comprising the POI, e.g., the area can comprise the grocery store, a gas station, a drug store, a fast food restaurant, etc., that can each be associated with events that can affect UE paths near the grocery store. As an example, where the grocery store is near a gas station and the grocery and the gas station both have an advertising event, a conventional system can falsely attribute an uptick in grocery store traffic to the grocery advertisement and fail to evaluate the effects of the gas station advertisement, more especially where the conventional system can be ignorant of other events in the area of the grocery store POI.

DETAILED DESCRIPTION

Figure 1:
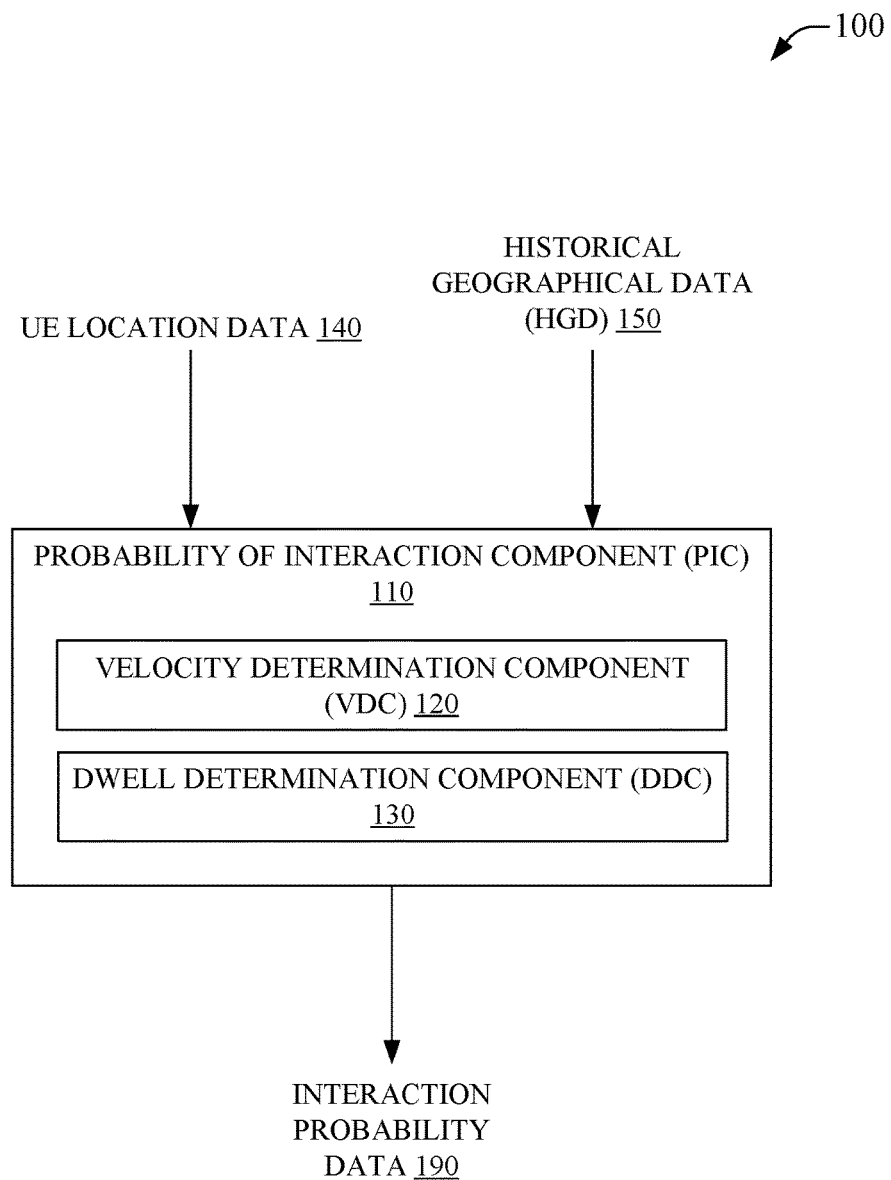
FIG. 1 is an illustration of an example system that can enable determining interaction probability data based on a velocity-weighted analysis of user equipment location data, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

UE location data can be generated by a variety of sources, e.g., global positioning system (GPS), triangulation, multilateration, proximity to an access point (AP), timed fingerprint location (TFL), network event locating system (NE-LOS), etc. This location data can indicate a location of a UE at a point in time. UE location data can, in some embodiments, be comprised in common location format (CLF) data. Generally, the location data can also be associated with a degree of accuracy. The accuracy can correspond to the location technology sourcing the UE location data. UE location data can be used to determine a path of travel for a UE. The path of travel can be correlated to a geographical location associated with a point of interest (POI). Where a probable UE route comprises a portion of an area associated with a POI, the UE location data can be analyzed to evaluate the effect of POI event(s) on UE movement. Changes in UE movement, e.g., UE velocity and/or UE dwell, etc., can be indicative of an effect of a POI event. As an example, while a conventional system can indicate that an event likely resulted in more UE traffic to a geographic location of a POI, the presently disclosed subject matter can indicate that the event resulted in the UE lingering in an area comprising the POI for a longer period of time. As such, even where the UE may not explicitly enter a grocery store in response to a served advertisement, it can be shown by the presently disclosed subject matter that the served advertisement resulted in a change in behavior of the UE that can be attributed to the adverting event. Moreover, the presently disclosed subject matter can consider the interaction of a plurality of events ascribed to one or more POIs on the overall velocity of the UE. This can enable attribution of an effect to combinations of events, for example, advertising for potato chips can have a first effect, advertising for dip can have a second effect, and advertising for chips and advertising for dip near in time can have a third effect that can be different than the sum of the first and second effect.

In an embodiment, the disclosed subject matter can determine a velocity of a UE. The velocity can be related to a change in the position of the UE, e.g., difference between a first location and a second location, between a first and second time. A geographical area can be associated with the change in position of the UE. The determined velocity can then be associated with the geographical area. A location of a POI can be determined. Where the POI location is within the geographical area of the UE change in position, the velocity of the UE for that change in position can reflect effects of events, e.g., advertising served to the UE, traffic, weather, date/time, a user schedule associated with the UE, police action, sporting events, etc.

In some embodiments, historical UE travel between the first and the second position can be employed to determine different probable routes between the first and the second positons. As an example, historically, UEs moving from a museum, e.g., a first location, to a subway station, e.g., a second location, can traverse a sidewalk for two blocks, e.g., a first route, or cut through a park, e.g., a second route. The example second route can be faster than the example first route, perhaps because of avoiding pedestrian crossings, etc. As such, the present disclosure can associate movement of a UE with a geographical area cutting through the park between the museum and the subway station. As a result, POIs in/near the park can be considered affected by the velocity of the UE, while POIs along the sidewalk can be considered unaffected by the velocity of the UE. Furthermore, the geographic area can be adapted to reflect a distribution of use of the different routes, for example, where 99% of historical UEs use the second route, the geographical area can be more constrained to the route through the park, while in contrast, where 52% of historical UEs use the second route and 48% use the first route, the geographical area can be broadened to include some or all of the first route in addition to the second route. This, in effect, can enable attribution of an event effect to POIs along both the first and second routes.

Additionally, location accuracy can be employed to adapt the geographical area associated with UE travel. Where location data is of a first accuracy, the geographic area can reflect a first level of constraint relative to the first and second locations. In contrast, where the location data is of a second accuracy, the geographic area can reflect a second level of constraint relative to the first and second locations. As an example, where the first accuracy is on the order of a few meters, then the geographical area can include POIs within a few meters of a probably route between the first and second locations, while where the accuracy is on the order of several hundred meters, the geographical area can be expanded to cover POIs within hundreds of meters of the probably route. It will be noted that where location data is being captured for UEs at an increasingly finer grain, adapting the geographic area associated with a probable route can be increasingly effective.

In an aspect, a UE velocity can be based on a change in position over time, $V=(p_2-p_1)/(t_2-t_1)$. As such, moving from a museum ($p_1$) to a subway station ($p_2$) faster, results in an increased velocity because the denominator decreases while the numerator remains the same. The UE velocity can therefore be considered to represent the average rate of travel for the UE between the first and second locations. Of note, the higher the velocity, typically the less likely a user of the UE will have to interact with POIs, e.g. if a UE races past a coffee stand at 50 miles per hour, they can be far less likely to have stopped and ordered a coffee than if the UE had moved past the coffee stand at 2 miles per hour. As such, it can typically be accepted that, in general, higher UE velocities correspond to less efficacious POI events.

UE dwell values can represent an amount of time a UE occupies an area between the first and second locations. UE dwell can be written as $D=(t_2-t_1)/(p_2-p_1)$. Moreover, dwell can be normalized across multiple locations, n, e.g.

$$D_{12} = \frac{(t_2 - t_1)/(p_2 - p_1)}{\sum_{i=1}^{n} (t_n - t_{n-1})/(p_n - p_{n-1})}.$$

Normalized dwell can represent an amount of time per unit distance, such that higher dwell can be correlated to the UE spending more time traveling per unit distance between the first and second locations. Where dwell values are greater, the UE can be understood to have moved between the first and second locations more slowly, e.g. at a lower velocity, and therefore can be understood to have a higher likelihood of being affected by a POI event. UE velocity can reflect UE movement per unit time, while UE dwell can reflect UE time spent per unit distance. UE velocity and UE dwell can be inversely related, e.g. a higher velocity corresponds to a lower dwell, etc.

In an embodiment, the UE velocity and/or UE dwell can be employed in determining the geographical area of a probable route between the first and second locations. The geographical area can be of nearly any shape or volume. As an example, the geographical area can be an oval comprising the first and second locations, e.g. 270, 272, 276, of FIG. 2, etc. As another example, the geographical area can be a rectangular area comprising the first and second locations, e.g. 274 of FIG. 2, etc. As further examples, the geographical area can be a polygon, cube, rotated oval, toroid, or nearly any other shape. Moreover, in some embodiments, the geographical area can reflect probably routes, such as can be determined from historical UE movement data, see the description of FIG. 2 for some examples.

In an embodiment, UE location data can be employed to determine interaction probability data, e.g., a scoring or ranking of how likely an event is to result in interaction based on the velocity/dwell of a UE with a geographical area corresponding to a location of a POI. The interaction probability data can be determined on a first side of a communications framework and then be communicated to a remote component on a second side of the communications framework for dissemination to requesting entities, e.g., a more distributed analysis. In some embodiments, the interaction probability data can be determined on the second side of the communications framework, based on UE location data from the first side of the communications framework, e.g. a more centralized analysis.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate determining interaction probability data based on a velocity-weighted analysis of user equipment (UE) location data, in accordance with aspects of the subject disclosure. System 100 can comprise probability of interaction component (PIC) 110. PIC 110 can enable determining interaction probability data 190, based on UE location data 140. Interaction probability data 190 can, in some embodiments, be based on UE location data 140 and historical geographical data (HGD) 150. In an aspect, interaction probability data 190 can represent a probability of a user of a UE reacting to an event, particularly an event associated with an entity at a point of interest (POI). As an example, interaction probability data 190 can represent a likelihood that movement of a UE changed as a result of an advertising event associated with a store, such as going to the store, moving towards the store, slowing down proximate to the store, moving towards a competing store, etc.

Interaction probability data 190 can be based on UE location data 140. UE location data 140 can comprise a location and a corresponding time. In some embodiments, UE location data can comprise other information, e.g., an accuracy metric, a UE identifier, etc. UE location data 140 can be employed to determine a change in position in time, e.g., movement of the UE from a first position at a first time to a second position at a second time, etc. PIC 110 can comprise velocity determination component (VDC) 120. VDC 120 can determine a UE velocity based on UE location data 140. UE velocity can represent a change in position per unit time. In an embodiment a UE velocity can be based on, $V=(p_2-p_1)/(t_2-t_1)$, where V is the UE velocity, $p_2$ is a second position, e.g. location, of the UE at a second time, $t_2$, and $p_1$ is a first position of the UE, at a first time $t_1$. Typically, $p_2$ and $p_1$ are different and $t_2$ and $t_1$ are different. It will be noted that the values comprising UE location data 140, e.g. $p_2$, $p_1$, $t_2$, $t_1$, etc., can be received from one or more sources, for example, $(p_2, t_2)$ can be derived from GPS data, while $(p_1, t_1)$ can be derived from Wi-Fi location technology, NELOS data, TFL data, triangulation, CLF data, etc.

PIC 110 can comprise dwell determination component (DDC) 130. DDC 130 can determine a UE dwell based on UE location data 140. UE dwell can represent a change in time per unit distance. In an embodiment a UE dwell can be based on, D=

$$\frac{1}{V} = (t_2 - t_1)/(p_2 - p_1),$$

where D is UE dwell, V is the UE velocity, $p_2$ is a second position of the UE at a second time, $t_2$, and $p_1$ is a first position of the UE, at a first time $t_1$. Typically, $p_2$ and $p_1$ are different and $t_2$ and $t_1$ are different. As was previously noted, the values comprising UE location data 140 can be received from one or more sources. In an aspect, the UE velocity and the UE dwell can be inversely related. In an embodiment, the UE dwell can be normalized against other determined UE dwell values, n, e.g., $$D_{12} = \frac{(t_2 - t_1)/(p_2 - p_1)}{\sum_{i=1}^{n} (t_n - t_{n-1})/(p_n - p_{n-1})}.$$

In an aspect, the UE dwell, or alternatively the normalized UE dwell, hereinafter UE dwell, can be associated with a geographical area comprising a probable route of the UE for the corresponding period. As such, the UE dwell can represent a relative amount of time the UE spends in each distance unit of the geographical area, e.g., the larger the UE dwell, the longer the UE is in the geographical area, which can inherently increase the likelihood of a user of the UE experiencing a POI event, e.g., an increased probability of interaction between the user of the UE and the entity at the POI. Similarly, the UE velocity can also be associated with the geographical area and can represent a distance change per unit time, e.g., the lower the UE velocity, the longer the UE takes to traverse the geographic area and inherently the greater the chance of interaction between the user of the UE and the entity at the POI.

PIC 110 can determine interaction probability data 190 based on the UE dwell or UE velocity for events associated with POIs comprised in the determined geographical area. Where a POI is located in the geographical area, the UE dwell value, or the UE velocity value, can correspond to a probability of interaction. Where the POI is not located in the geographical area, it is not sufficiently likely to be along a probably UE route and an interaction probability need not be determined. As an example, a UE moving from an office in a building to a parking lot in the basement of the building may typically pass by a first vending machine on the same floor as the office, e.g., in the elevator lobby, but may rarely pass by a second vending machine in the lobby where the elevator ride to the basement parking simply bypasses the lobby altogether. In this example, the geographical area can comprise a horizontal area from the office to the elevator including the location of the first vending machine, the vertical elevator shaft, and the horizontal area from the elevator to the parking, but can exclude the lobby, and therefore exclude the location of the second vending machine. Accordingly, in this example, an increase in the UE dwell value can indicate that a correlated event can increase the interaction probability of a user of the UE with the first vending machine but not the second vending machine.

In some embodiments, HGD 150 can facilitate determining the geographical area. HGD 150 can comprise historical UE route information. This historical UE route information can be employed to determine probable routes between a first and a second location and therefore be used to determine a geographical area that can be associated with UE dwell or UE velocity. In an aspect, HGD 150 can comprise date/time data, UE route(s), concurrent event(s), user schedule information, etc. As such, HGD 150 can determine, for example, that a route form an office to a parking area typically uses a first bank of elevators before 7 pm, but typically uses a second bank of elevators after 7 pm. As another example, HGD 150 can be employed to determine a geographical area is larger during heavy weather and/or in heavy traffic to account for use of alternate roadways on a drive home from work being included in probable routes between the office and home for a user of a UE.

In an aspect, the geographical area typically includes a first and second location associated with the UE dwell or UE velocity. Moreover, the geographical area can be of any shape or volume, e.g., circular, ovular, toroidal, square, rectangular, polygonal, or combinations thereof. As an example, the geographical area in the office to parking area example above can be a three-dimensional shape comprising a volume of the office floor, the elevator lobby, the elevator shaft for one or more elevator banks, and a volume in the underground parking area.

Figure 2:
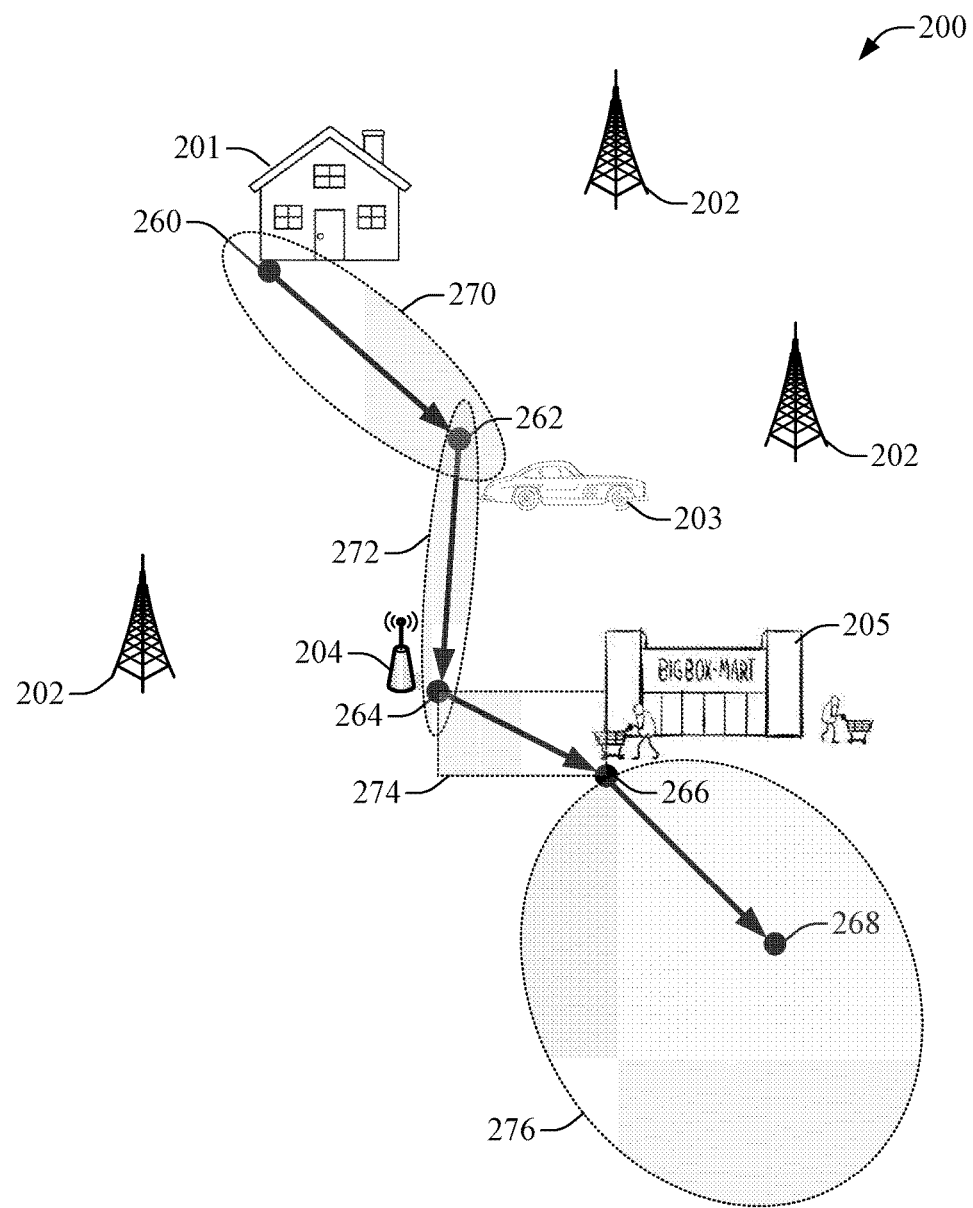
FIG. 2 is an illustration of an example system that can facilitate determining interaction probability data, based on a velocity-weighted analysis of user equipment location data relative to a probable user equipment route, in accordance with aspects of the subject disclosure.

FIG. 2 is an illustration of a system 200, which can facilitate determining interaction probability data, based on a velocity-weighted analysis of UE location data relative to a probable user equipment route, in accordance with aspects of the subject disclosure. System 200 can comprise home 201 at location 260. A UE can travel to car 203 at location 262. The movement of the UE can be employed to determine a UE dwell for geographical area 270 that comprises location 260 and location 262. UE location data at 260 can be based, for example, on UE connectivity to a home network, e.g., via Wi-Fi, femtocell, Bluetooth, etc. UE location data at 262, can be based, for example, on UE triangulation via cell towers 202. The UE can travel, via car 203, from location 262 to location 264. The movement of the UE can be employed to determine a UE dwell for geographical area 272 that comprises location 262 and location 264. UE location data at 264, can be based, for example, on UE connectivity to access point (AP) 204. The UE can travel from location 264 to store 205 at location 266. The movement of the UE can again be employed to determine a UE dwell for geographical area 274 that comprises location 264 and location 266. UE location data at 266, can be based, for example, on UE GPS data. The UE can then travel from location 266 to location 268. Again, the movement of the UE can be employed to determine a UE dwell for geographical area 276 that comprises location 266 and location 268. UE location data at 268, can be based, for example, on inertial movement location technology.

The shape of geographical areas 270, 272, 274, and 276 can be the same, not illustrated, or different. Intuitively, walking from home 201 at location 260 to car 203 located at 262 can take a variety or routes, although typically those routes are likely to be less circuitous than perhaps a casual stroll for exercise. As such, the example geographical area 270 can include areas around location 260 and 262 as well as some alternate routes between 260 and 262, leading to the width of the elliptical shape. Comparing geographical area 270 to geographical area 272, area 272 can be narrower that area 270 owing to car 203 being constrained to driving on the road between 262 and 264. Between 264 and 266, car 203 can have multiple alternative routes on a city block grid system, which can result in the rectangular shape of geographical area 274. Further, the drive to 268 from 266 can include several alternative routes that can go, for example, past 268 before return thereto, contributing to an extension of the region of geographical area 276 beyond location 268. Moreover, an error associated with the inertial movement location technology used to determine the UE location at location 268 can contribute to altering the shape of area 276 and result in some of the bulbous nature of area 276 around location 268.

Figure 3:
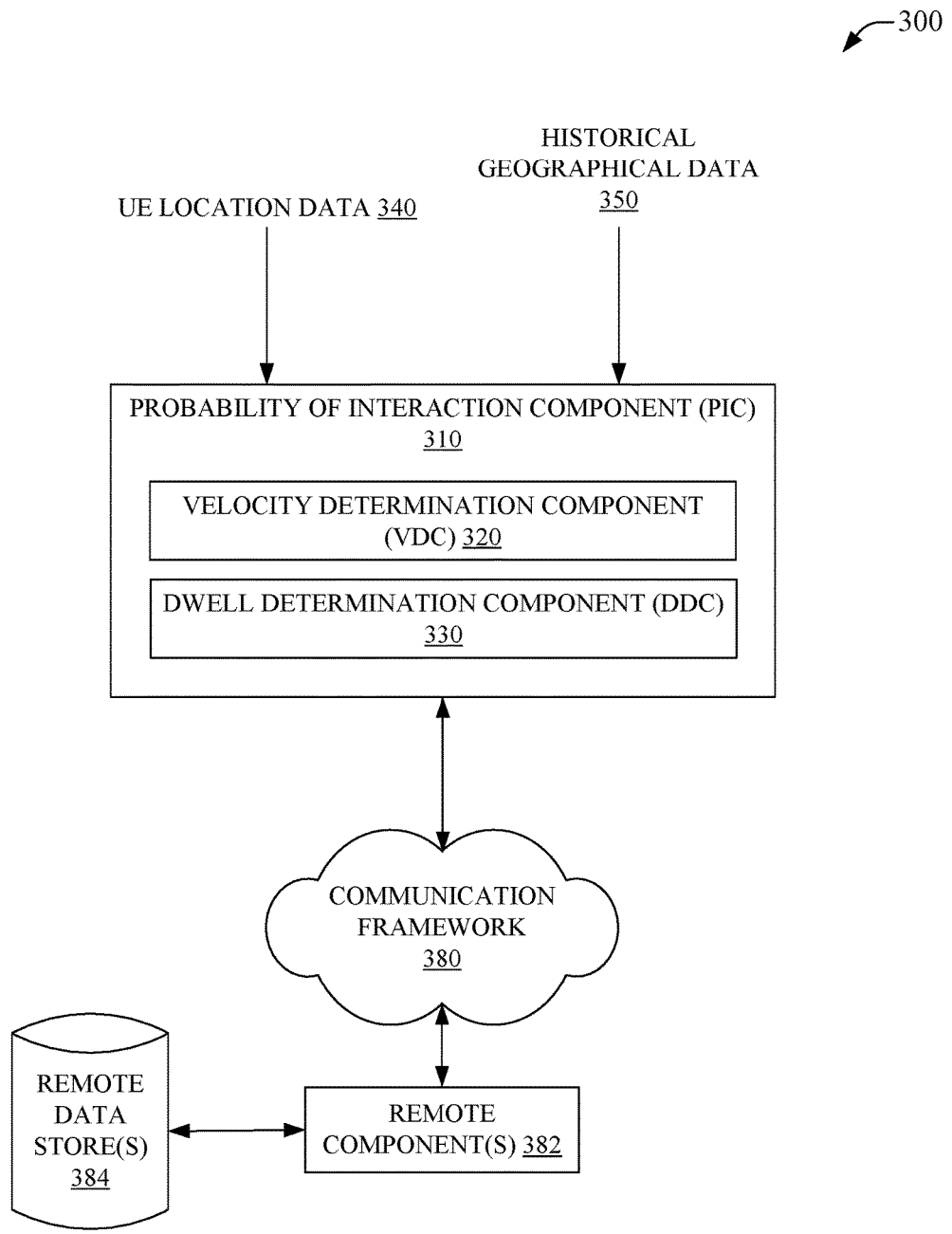
FIG. 3 is an illustration of an example system that can facilitate determining interaction probability data for communication to a remotely located component in accordance with aspects of the subject disclosure.

FIG. 3 is an illustration of a system 300, which can facilitate determining interaction probability data for communication to a remotely located component, in accordance with aspects of the subject disclosure. System 300 can comprise PIC 310. PIC 310 can comprise VDC 320 that can determine UE velocity data based on UE location data 340. PIC 310 can comprise DDC 330 that can determine UE dwell data based on UE location data 340. PIC 310 can correlate UE dwell data or UE velocity data to a geographical area corresponding to a probable UE route. The probable UE route can be determined based on UE location data 340. In some embodiments, the probable UE route can be further based on HGD 350.

In an aspect, PIC 310 can be located on a first side of a communication framework that is located remotely from remote component(s) 382 and remote data store(s) 384. As an example, PIC 310 can be located in a radio access network (RAN) component, a NodeB or eNodeB device, a femtocell, picocell, access point, a UE, a wearable device, a laptop computer, a tablet computer, etc., and can communicate interaction probability data to remote component(s) 382, for example a server, virtual device, a cloud device, a carrier-side component, etc., via communication framework 380, e.g., a network, the internet, etc. System 300 enables distributed determination of interaction probability data that can then be communicated to more central component, which can store and distribute the interaction probability data. As an example, remote component(s) 382 can be a virtualized network operator component that serves interaction probability data to advertising entities. In some embodiments, the interaction probability data can be further processed on the remote side of communication framework 380, e.g., via remote component(s) 382, for example, to determine a response value correlating an event at a POI to the interaction probability data, e.g., a UE dwell value, UE velocity value, etc., to gauge the efficacy of the event.

Figure 4:
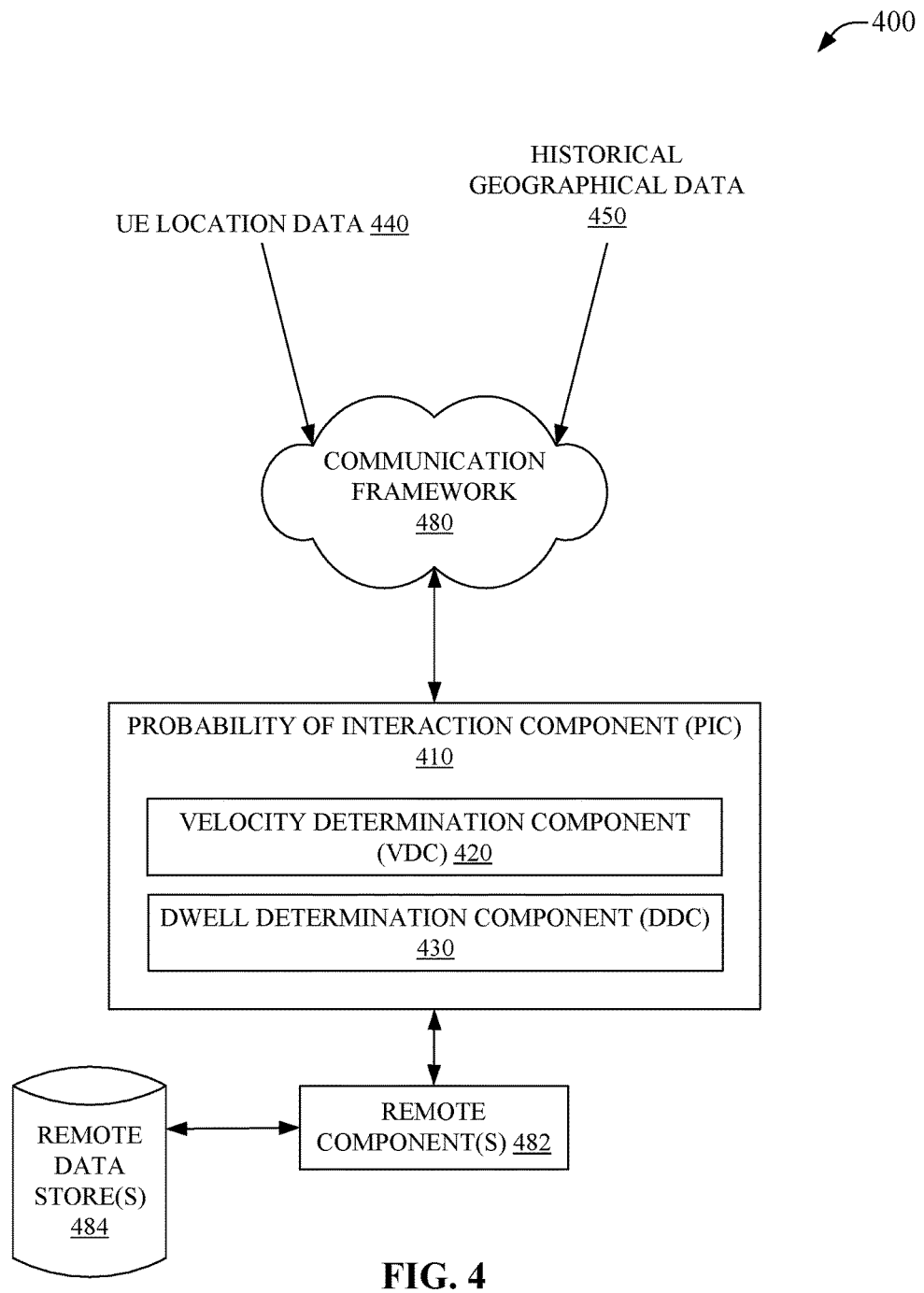
FIG. 4 is an illustration of an example system that can facilitate remotely determining interaction probability data in accordance with aspects of the subject disclosure.

FIG. 4 is an illustration of a system 400, which can facilitate remotely determining interaction probability data in accordance with aspects of the subject disclosure. System 400 can comprise PIC 410. PIC 410 can comprise VDC 420 that can determine UE velocity data based on UE location data 440. PIC 410 can comprise DDC 430 that can determine UE dwell data based on UE location data 440. PIC 410 can correlate UE dwell data or UE velocity data to a geographical area corresponding to a probable UE route. The probable UE route can be determined based on UE location data 440. In some embodiments, the probable UE route can be further based on HGD 450.

In an aspect, UE data 440 and/or HGD 450 can be received from a first side of communication framework. Moreover, PIC 410 can be located on a second side of a communication framework that is located remotely from sources of UE data 440 and/or HGD 450. Remote component(s) 482 and remote data store(s) 484 can be located on the second side of communication framework 480. As an example, PIC 410 can be located in a server, virtual device, a cloud device, a carrier-side component, etc. PIC 410 can receive UE location data 440 and/or HGD 450 via communication framework 480, e.g., a network, the internet, etc., from a radio access network (RAN) component, a NodeB or eNodeB device, a femtocell, picocell, access point, a UE, a wearable device, a laptop computer, a tablet computer, etc. PIC 410 can communicate interaction probability data to remote component(s) 482. System 400 enables centralized determination of interaction probability data that can then be stored, e.g., via remote data store(s) 484, and distributed. As an example, PIC 410 can be located on a network operator core-network device and communicate interaction probability data remote component(s) 482 that can be a server operated by, for example, a third party entity.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
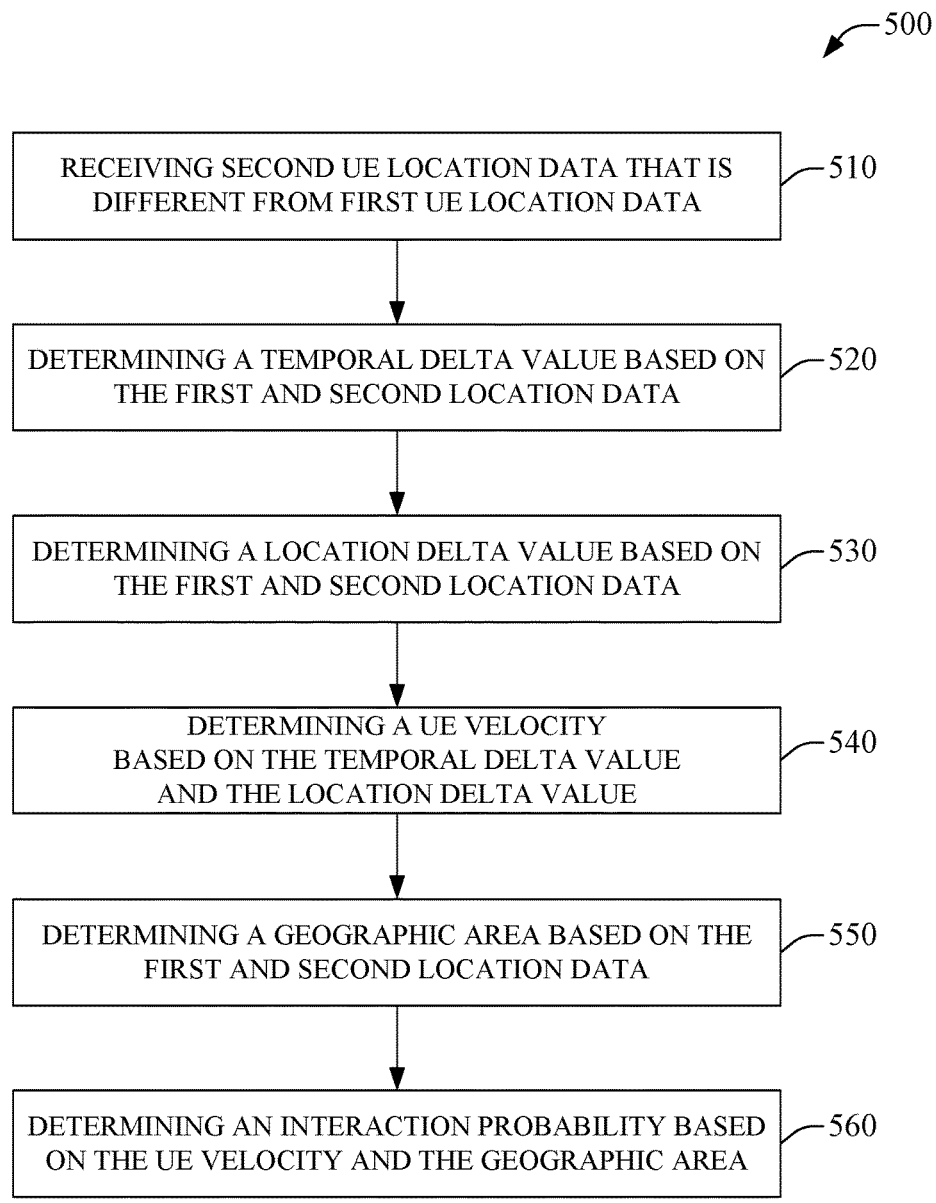
FIG. 5 illustrates an example method enabling determination of an interaction probability, based on a velocity-weighted analysis of user equipment location data, in accordance with aspects of the subject disclosure.

FIG. 5 illustrates example method 500 facilitating determination of an interaction probability, based on a velocity-weighted analysis of user equipment location data, in accordance with aspects of the subject disclosure. Method 500, at 510, can comprise receiving second UE location data that is different from first UE location data. UE location data can comprise a location, a corresponding time, accuracy metric, etc. As such, at 520, method 500 can determine a temporal delta value, e.g., a difference in time values, based on the first and second location data. At 530, method 500 can comprise determining a location delta value, e.g., a difference in location values, based on the first and second location data.

At 540, method 500 can determine a UE velocity based on the temporal delta value and the location delta value. The UE velocity can be determined from $V=(p_2-p_1)/(t_2-t_1)$, where V is the UE velocity, $(p_2-p_1)$ is the location delta value and $(t_2-t_1)$ is the temporal delta value, with $p_2$ being the UE location at the second time, $t_2$, and $p_1$ being the UE location at the first time $t_1$. Typically, $p_2$ and $p_1$ are different and $t_2$ and $t_1$ are different. It will be noted that the values comprising the second UE location data, e.g. $p_2$, $t_2$, and the values comprising the first UE location data, e.g. $p_1$, $t_1$, can be received from one or more sources, for example, $(p_2, t_2)$ can be derived from GPS data, while $(p_1, t_1)$ can be derived from Wi-Fi location technology, NELOS data, TFL data, triangulation, CLF data, etc.

At 550, a geographic area can be determined based on the first and second location data. In an aspect, the geographic area can be any shape or volume and typically comprises the first and second location associated with the first and second location data at 510. In an aspect, the geographical area can represent an area comprising a route a UE can take between the first and second location. As an example, a default rectangular geographical area can be selected with a corner on each of the first and second locations, e.g. see area 274 of FIG. 2, representing that a route between 264 and 266 lie within are 274. Moreover, more advanced determinations the geographical area can be performed and can comprise adapting the geographical area based on error/accuracy of the UE location data, historical UE route data, map data, roadway data, etc.

At 560, method 500 can comprise determining an interaction probability based on the UE velocity and the geographical area. At this point, method 500 can end. The interaction probability can represent a probability that a user of a UE will respond to an event attributed to a point of interest (POI). Where the POI location is within the geographical area from 550, the UE velocity correspond to the probability of interaction. Where the UE velocity is high it can be a decrease in a likelihood that an interaction will occur in response to the event, and where the UE velocity is low there can be an increased likelihood of interaction.

Figure 6:
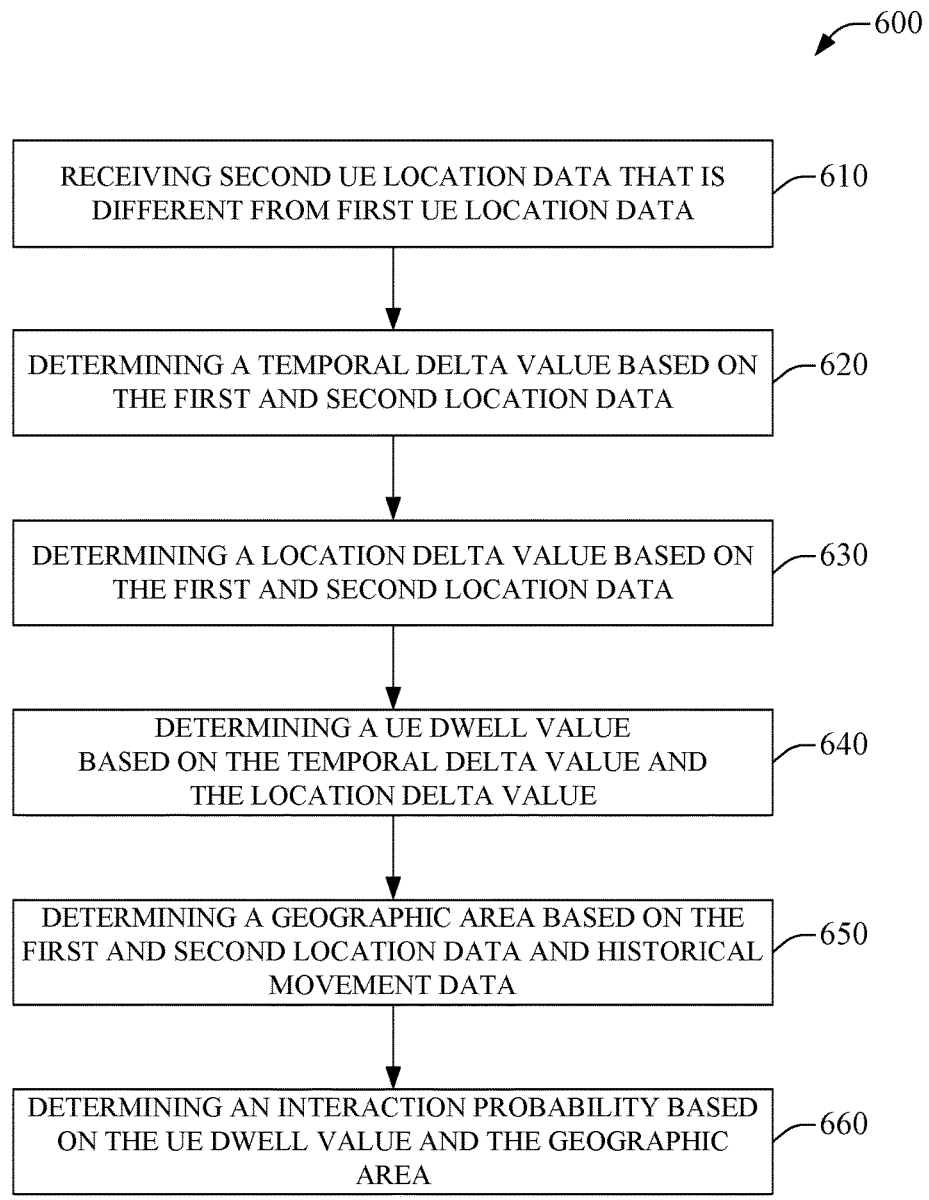
FIG. 6 illustrates an example method facilitating determining an interaction probability based on a dwell value and a geographical area, derived from historical movement data, in accordance with aspects of the subject disclosure.

FIG. 6 illustrates example method 600 enabling determining an interaction probability based on a dwell value and a geographical area, derived from historical movement data, in accordance with aspects of the subject disclosure. Method 600, at 610, can comprise receiving second UE location data that is different from first UE location data. UE location data can comprise a location, a corresponding time, accuracy metric, etc. As such, at 620, method 600 can determine a temporal delta value, e.g., a difference in time values, based on the first and second location data. At 630, method 600 can comprise determining a location delta value, e.g., a difference in location values, based on the first and second location data.

At 640, method 600 can determine a UE dwell value based on the temporal delta value and the location delta value. The UE velocity can be determined from $$D = \frac{1}{V} = (t_2-t_1)/(p_2-p_1),$$

where D is UE dwell, V is the UE velocity, $(p_2-p_1)$ is the location delta value and $(t_2-t_1)$ is the temporal delta value, with $p_2$ being the UE location at the second time, $t_2$, and $p_1$ being the UE location at the first time $t_1$. Typically, $p_2$ and $p_1$ are different and $t_2$ and $t_1$ are different. It will be noted that the values comprising the second UE location data, e.g. $p_2$, $t_2$, and the values comprising the first UE location data, e.g. $p_1$, $t_1$, can be received from one or more sources.

At 650, a geographic area can be determined based on the first location data, second location data, and historical UE movement data. In an aspect, the geographic area can be any shape or volume and typically comprises the first and second location associated with the first and second location data at 610. In an aspect, the geographical area can represent an area comprising a route a UE can take between the first and second location. Moreover, the geographical area can comprise a probable route of the UE for the corresponding period. The historical UE movement data can be employed to determine probable routes between the first and the second location and therefore be used to determine a geographical area. In an aspect, historical UE movement data can comprise date/time data, UE route(s), concurrent event(s), user schedule information, etc. As such, historical UE movement data can be used to determine a geographical area that corresponded to a level of probability that a route will be taken based on various historical factors. As an example, where historical UEs overwhelmingly use three of five possible routes on days where a sporting event occurs, the geographical area can comprise and area encompassing the three routes when a sporting event is occurring and can encompass the five routes when no sporting event is occurring. Moreover, more advanced determinations the geographical area can be performed and can comprise adapting the geographical area based on error/accuracy of the UE location data, historical UE route data, map data, roadway data, etc.

At 660, method 600 can comprise determining an interaction probability based on the UE dwell and the geographical area. At this point, method 600 can end. The interaction probability can represent a probability that a user of a UE will respond to an event attributed to a point of interest (POI). Where the POI location is within the geographical area from 650, the UE dwell corresponds to the probability of interaction. Where the UE dwell is low there can be a decrease in a likelihood that an interaction will occur in response to the event, and where the UE dwell is high there can be an increased likelihood of interaction.

Figure 7:
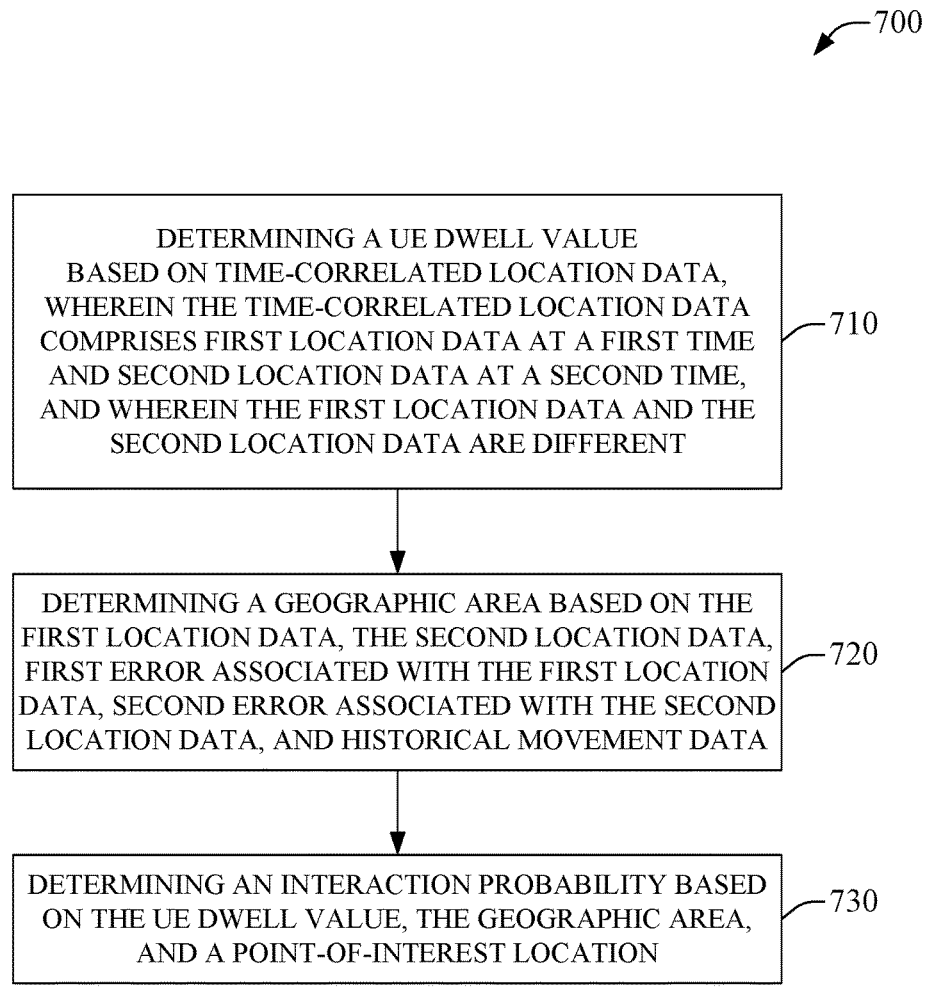
FIG. 7 illustrates an example method facilitating determining an interaction probability based on a dwell value and a location error corrected geographical area in accordance with aspects of the subject disclosure.

FIG. 7 illustrates example method 700 that facilitates determining an interaction probability based on a dwell value and a location error corrected geographical area in accordance with aspects of the subject disclosure. Method 700, at 710, can comprise determining a UE dwell value based on time-correlated location data. The time-correlated location data can comprise first location data at a first time and second location data at a second time. The first location data and the second location data can be different.

At 720, method 700 comprises determining a geographic area based on the first location data, the second location data, first error associated with the first location data, second error associated with the second location data, and historical movement data. Historical UE movement data can comprise date/time data, UE route(s), concurrent event(s), user schedule information, etc. As such, historical UE movement data can be used to determine a geographical area that corresponded to a level of probability that a route will be taken based on various historical factors. Moreover, more advanced determinations the geographical area can be performed and can comprise adapting the geographical area based on accuracy of the UE location data, historical UE route data, map data, roadway data, etc. As an example, the geographical area can be adapted based on the error in the location data, e.g. increasing location error can correspond to an increase in the geographical area to more confidently include the location in the geographical area.

At 730, an interaction probability can be determined by method 700. The interaction probability can be based in the UE dwell value, the geographical area, and a location of a POI. At this point method 700 can end. The interaction probability can represent a probability that a user of a UE will respond to an event attributed to a point of interest (POI). Where the POI location is within the geographical area from 720, the UE dwell can correspond to the probability of interaction. Where the UE dwell is high it can increase a likelihood that an interaction will occur in response to the event, and where the UE dwell is low there can be decreased likelihood of interaction.

Figure 8:
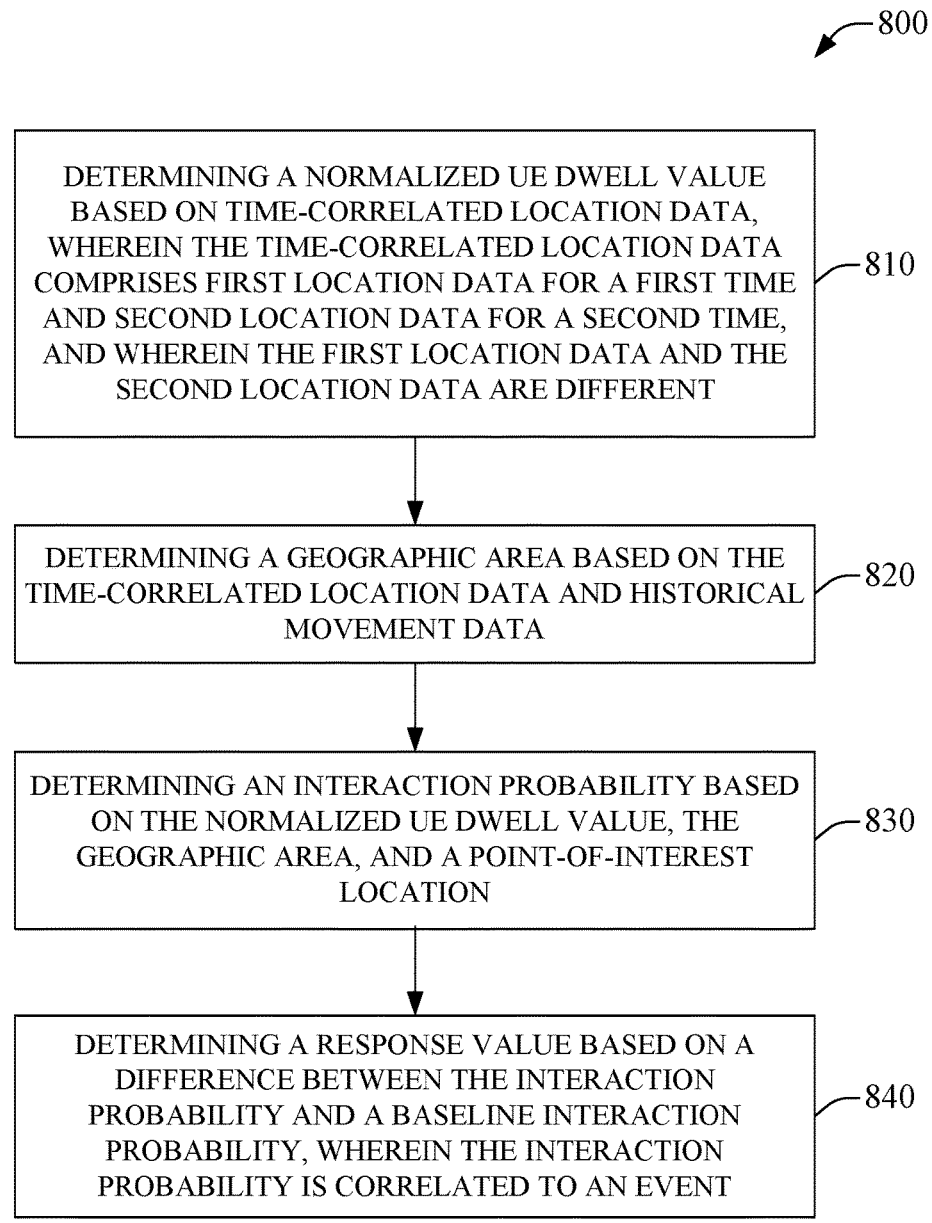
FIG. 8 illustrates an example method enabling determining a response value based on a deviation of an interaction probability from a baseline interaction probability in accordance with aspects of the subject disclosure.

FIG. 8 illustrates example method 800 facilitating determination of a response value based on a deviation of an interaction probability from a baseline interaction probability in accordance with aspects of the subject disclosure. Method 800, at 810, can comprise determining a normalized UE dwell value based on time-correlated location data. The time-correlated location data can comprise first location data at a first time and second location data at a second time. The first location data and the second location data can be different. The normalized UE dwell value between location 1 and location 2, e.g., the first and second locations, normalized to n total locations can be represented by $$D_{12} = \frac{(t_2 - t_1)/(p_2 - p_1)}{\sum_{i=1}^{n} (t_n - t_{n-1})/(p_n - p_{n-1})},$$

where $D_{12}$ is the UE dwell between 1 and 2, $p_2$ is a second position of the UE at a second time, $t_2$, and $p_1$ is a first position of the UE, at a first time $t_1$. Typically, $p_2$ and $p_1$ are different and $t_2$ and $t_1$ are different.

At 820, method 800 comprises determining a geographic area based on the time-correlated location data, e.g., the first location data and the second location data, and historical movement data. Historical UE movement data can comprise date/time data, UE route(s), concurrent event(s), user schedule information, etc. As such, historical UE movement data can be used to determine a geographical area that corresponded to a level of probability that a route will be taken based on various historical factors. Moreover, more advanced determinations the geographical area can be performed and can comprise adapting the geographical area based on error/accuracy of the UE location data, historical UE route data, map data, roadway data, etc.

At 830, an interaction probability can be determined by method 800. The interaction probability can be based in the normalized UE dwell value, the geographical area, and a location of a POI. The interaction probability can represent a probability that a user of a UE will respond to an event attributed to a point of interest (POI). Where the POI location is within the geographical area from 820, the UE dwell can correspond to the probability of interaction. Where the UE dwell is high it can increase a likelihood that an interaction will occur in response to the event, and where the UE dwell is low there can be decreased likelihood of interaction.

At 840, method 800, can determine a response value. The response value can be based on a difference between the interaction probability and a baseline interaction probability. At this point method 800 can end. The baseline interaction probability can represent interaction probabilities related to historical UE movement, particularly with regard to the historical UE movement between the locations of the time-correlated location data. In an aspect, this can be viewed as monitoring the historical likelihood of interaction for UEs traversing between two points and then, based on a change from the baseline to the instant interaction probability, as correlated to an event occurrence, determining a response value. The response value can then be correlated to the event occurrence. In an example, a baseline interaction response can be determined for UEs passing by a gas station on a lonely stretch of highway. Where the gas station adds a fast food kiosk, the UE dwell and UE velocities for a geographical area including the gas station can change, resulting in a change in the interaction probability. This change in the interaction probability can be attributed to the addition of the fast food kiosk and the effect can be measured by the response value.

Figure 9:
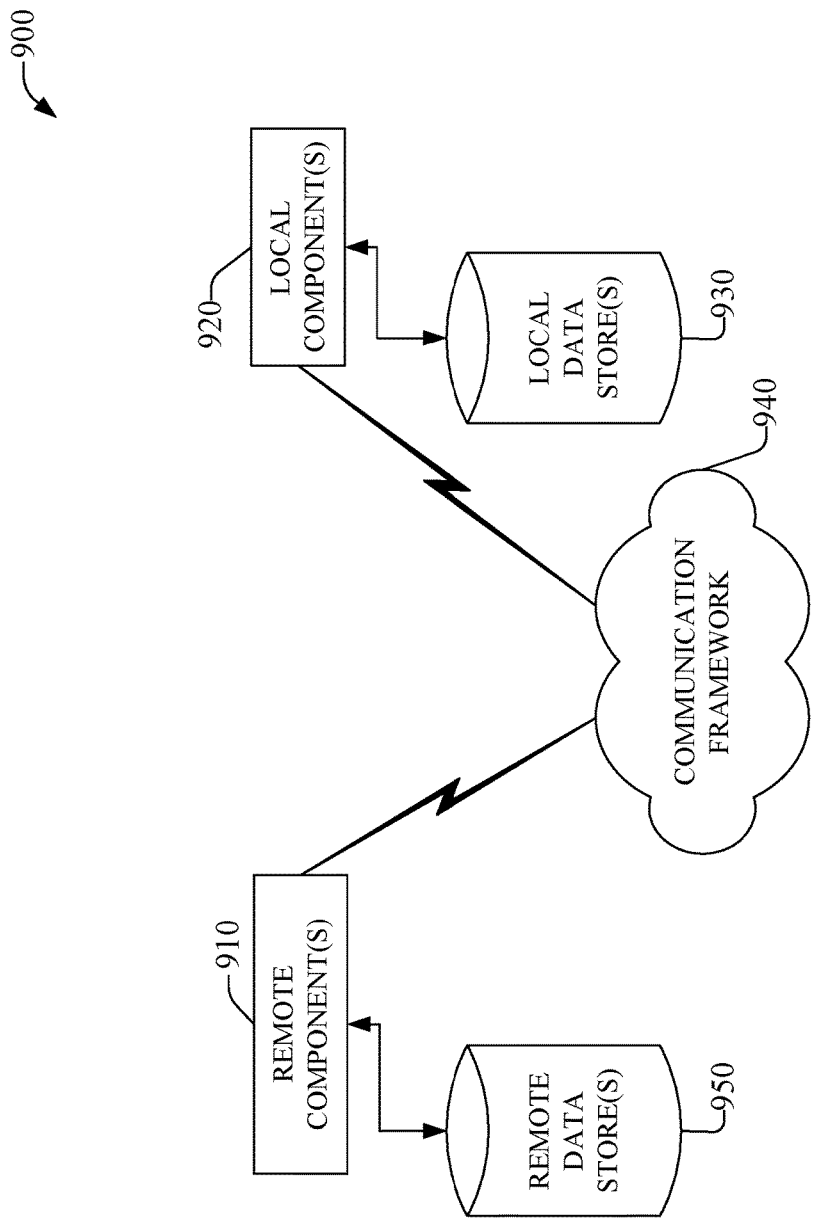
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication core-network devices, etc. As an example, remote component(s) 910 can be a server or virtual component, e.g., as disclosed in relation to FIG. 3, that can receive interaction probability data, e.g., 190, from local component(s), etc.

The system 900 also comprises one or more local component(s) 920. The local component(s) 920 can be hardware and/or software (e.g., threads, processes, computing devices). In some embodiments, local component(s) 920 can comprise femtocell(s), picocell(s), access point(s), RAN device(s), NodeB(s), eNodeB(s), UE(s), personal computing device(s), wearable device(s), etc., for example, PIC 110, 310, 410, etc., can be comprised in an eNodeB, and can communicate, via a communication framework, e.g., 380, 480, etc., to a remote device(s), e.g., 382, 482, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, interaction probability data 190, etc., can be stored on remote data store(s) 384, 484, 950 of a remote component 910, UE location data 140, 340, 440, etc., HGD 150, 350, 450, etc., can be stored on local data store(s) 930, etc., or remote data store(s) 384, 484, 950.

Figure 10:
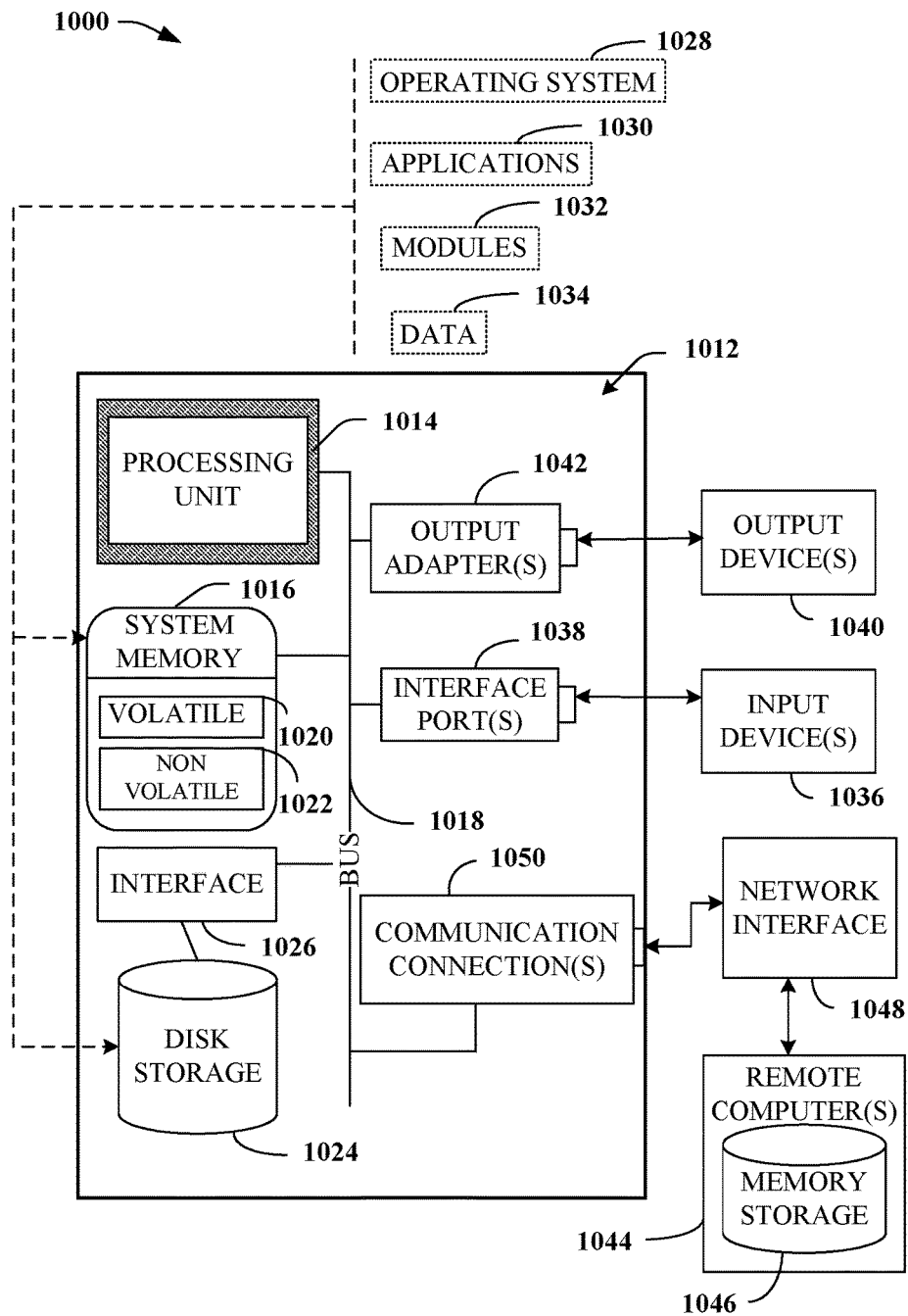
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, PIC 110, 310, 410, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising determining interaction probability data 190, etc., based on UE location data 140, 340, 440, etc., and/or HGD 150, 350, 450, etc.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, multiple-input and multiple-output (MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        based on a first location corresponding to a first time and a second location corresponding to a second time, determining a velocity value associated with a user equipment moving from the first location to the second location, wherein the velocity value is based on a distance between the first location and the second location and a time difference between the first time and the second time;
        receiving a dwell value for the user equipment in a first region comprising the first location and the second location; and
        determining an interaction value based on the velocity value, the dwell value, and a location of a point of interest, wherein the interaction value corresponds to a probability of a travel deviation for the user equipment ascribed to a characteristic of the point of interest.

2. The system of claim 1, wherein a decrease in the interaction value corresponds to an increase in the velocity value.

3. The system of claim 1, wherein a decrease in the interaction value corresponds to a decrease in the dwell value.

4. The system of claim 1, wherein the dwell value is based on a function of the distance between the first location and the second location and the time difference between the first time and the second time, and wherein the dwell value is different from the velocity value.

5. The system of claim 4, wherein the dwell value is inversely proportional to the velocity value.

6. The system of claim 1, wherein the determining the interaction value is further based on a historical velocity value.

7. The system of claim 1, wherein the determining the interaction value is further based on a historical dwell value.

8. The system of claim 1, wherein the first region is based on first historical travel of user equipments between the first location and second location.

9. The system of claim 8, wherein the user equipments comprise the user equipment, and wherein the first historical travel of user equipments comprises second historical travel of the user equipment between the first location and second location.

10. The system of claim 8, wherein the first region comprises a probable route of travel for the user equipment between the first location and the second location.

11. A method, comprising:
  determining, by a system comprising a processor, a velocity value for a user equipment based on a change in location of the user equipment during a time;
  determining, by the system, a travel route corresponding to the change in location;
  determining a proximity between a point of interest and at least a portion of the travel route;
  determining, by the system, a dwell value based on the change in location during the time, wherein the dwell value is different from the velocity value; and
  in response to receiving, by the system, an indication of an occurrence of an event associated with a point of interest, determining an interaction value based on the velocity value, the dwell value, and the travel route, wherein the interaction value represents a likelihood that the user equipment deviated from the travel route in response to the occurrence of the event associated with the point of interest.

12. The method of claim 11, wherein a decrease in the interaction value corresponds to an increase in the velocity value.

13. The method of claim 11, wherein a decrease in the interaction value corresponds to a decrease in the dwell value.

14. The method of claim 11, wherein the dwell value is a normalized dwell value and is a function the change in location during the time and a historical change in location during a historical time window.

15. The method of claim 11, wherein the determining the travel route is based on historical user equipment travel data.

16. A non-transitory machine-readable storage medium, comprising executable instructions that, when executed by a processor, facilitate performance of operations, comprising:
  determining a velocity value as a function of a first position of a user equipment at a first time and a second position of the user equipment at a second time;
  determining a geographic region encompassing a path between the first position and the second position, wherein the geographic region is based on historical user equipment movement data;
  in response to determining that a point of interest is located in the geographic region, determining a dwell value as a function of the first position, the second position, the first time, and the second time, wherein the dwell value is different from the velocity value; and
  enabling access to an interaction value, wherein the interaction value is based on the velocity value, the dwell value, and a location of the point of interest, and wherein the interaction value corresponds to a probability of a travel deviation for the user equipment ascribed to a characteristic of the point of interest.

17. The non-transitory machine-readable storage medium of claim 16, wherein a decrease in the interaction value corresponds to an increase in the velocity value.

18. The non-transitory machine-readable storage medium of claim 16, wherein a decrease in the interaction value corresponds to a decrease in the dwell value.

19. The non-transitory machine-readable storage medium of claim 16, wherein first location data indicating the first position and the first time is received from a first source, wherein second location data indicating the second position and the second time is received from a second source, and wherein the first source and the second source are not a same source.

20. The non-transitory machine-readable storage medium of claim 16, wherein the first position is determined via a first location determination technology that is different from a second location determination technology used to determine the second position.

* * * * *